(No Model.)
G. C. TWYMAN & B. P. EASLEY.
LANDSIDE PLOW.
No. 540,344. Patented June 4, 1895.
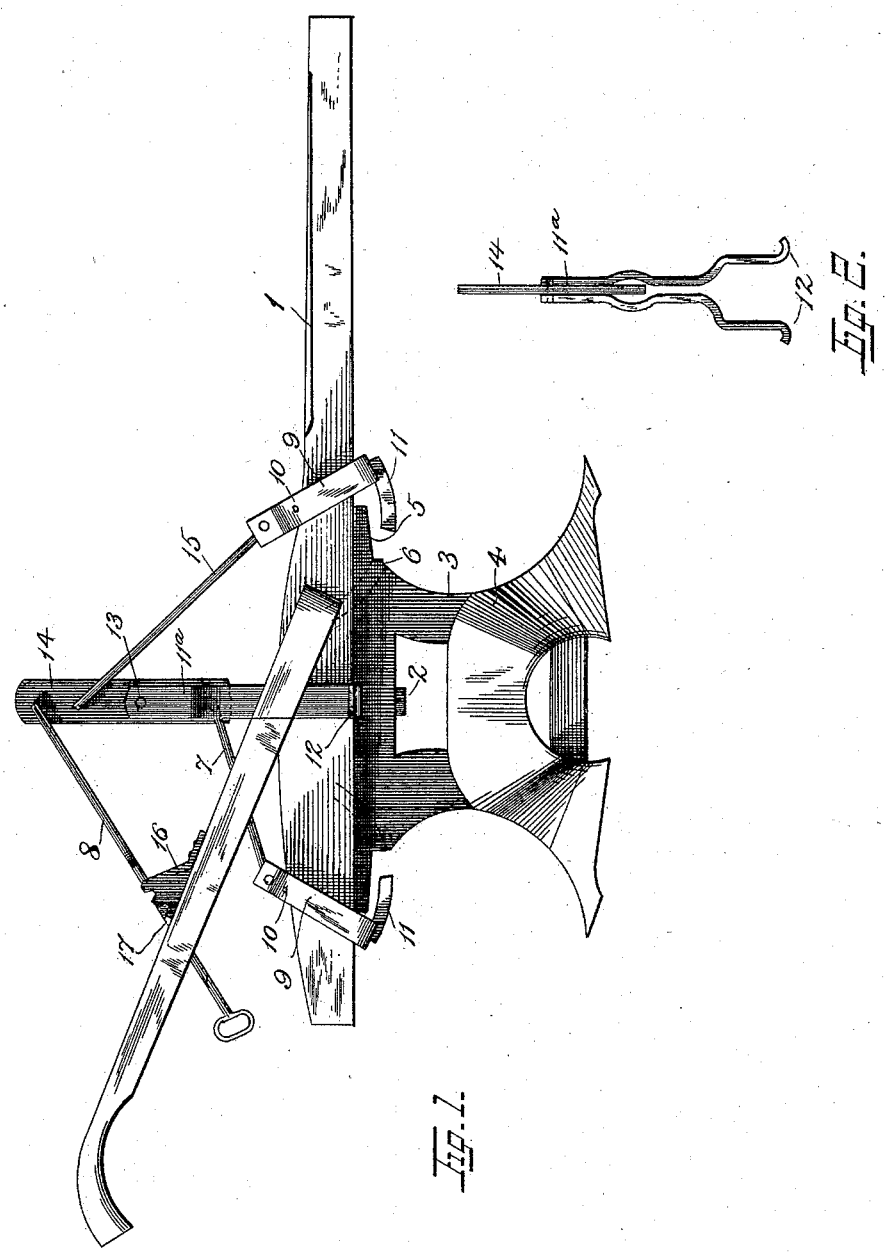
WITNESSES
W. T. S. Duvall
T. J. Keating.
INVENTORS
G. C. Twyman &
B. P. Easley.
By W. T. Duvall, Attorney

UNITED STATES PATENT OFFICE.

GOODLOE C. TWYMAN AND BERT P. EASLEY, OF BOWLING GREEN, KENTUCKY.

LANDSIDE-PLOW.

SPECIFICATION forming part of Letters Patent No. 540,344, dated June 4, 1895.

Application filed March 21, 1895. Serial No. 542,664. (No model.)

*To all whom it may concern:*

Be it known that we, GOODLOE C. TWYMAN and BERT P. EASLEY, citizens of the United States, residing at Bowling Green, in the county of Warren and State of Kentucky, have invented certain new and useful Improvements in Landside-Plows; and we do hereby declare the following to be a full, clear, and exact description of the invention, such as will enable others skilled in the art to which it appertains to make and use the same.

Our invention relates to improvements in hill-side or reversible plows; and the objects in view are to produce a plow especially adapted for successfully operating on hillsides; that can be readily reversed at the end of a furrow; is capable of being used either as a left or right-hand plow; to provide a convenient and efficient means of locking the plow and beam in either of its positions, and for a ready unlocking thereof when it is desired to alter their relative positions.

Other objects and advantages of the invention will hereinafter appear, and the novel features thereof will be particularly pointed out in the claims.

Referring to the drawings, Figure 1 is a side elevation of a plow constructed in accordance with our invention, the cuffs being shown as unlocked from the frame and the beam ready for reversal. Fig. 2 is a front elevation of the two standards that surmount the beam and carry the lock-operating mechanism.

Like numerals of reference indicate like parts in both figures of the drawings.

The plow-beam 1, has passed vertically therethrough at the proper point, the king-bolt 2, the lower end of which passes through the mold-board frame 3, which in this instance, is of the shape usually given to plows of this class, namely, the same at both ends. To the opposite lower ends of the frame 3 are secured the mold-boards 4, provided with the points and land-side, all as is usual. The two upper ends of the frame 3 are reduced near their extremities, as indicated at 5, and each of these portions is provided with holes 6, which are continued into the under side of the beam, as shown by dotted lines. The beam or stock is provided with handles, which are secured to the opposite sides thereof, and inclined backwardly above the rear end of the beam.

The beam is loosely embraced in front and in rear of the mold-board frame by a pair of cuffs 9, each of which is adapted to freely oscillate or swing upon a transverse pin 10, secured upon the upper side of the beam. These cuffs are located in front and in rear of the reduced portions 5 of the mold-board frame, and when swung in one direction or toward the frame they embrace the reduced portions of the same, and when swung in the opposite direction, or away from the frame, they release the same. It will thus be seen that when the cuffs are in the first position the plow-beam and mold-board frame are clasped or clamped together, and when they are in their second position, (as shown,) the beam is free to revolve upon the king-bolt 2, as in the act of reversing the plow so as to travel in an opposite direction. From the under side of each of the cuffs there may project toward the mold-board frame curved bolts 11, which when the cuffs are swung inward to their locking position, pass through the openings 6 in the ends of the mold-board frame and enter the sockets that form continuations thereof in the under side of the beam. It will now be seen that in the event of their use, a most secure locking of the parts take place when the cuffs are moved inward, in that the two parts, the beam and the frame, are clamped and bolted together, as well.

A pair of opposite vertical standards 11ª, are bolted to the opposite sides of the beam 1 and rise therefrom, the lower ends of the standards being preferably bent at right-angles to their remaining portions and having their ends slightly curved, as indicated at 12, so as to form a pair of spring detents for clasping the sides of the mold-board frame, whereby when said frame is thus embraced, the operator will know that the holes in the plow-beam are aligning with those in the mold-board frame and that the reduced ends of the mold-board frame are in line with the cuffs.

Pivotally mounted between the upper ends of the standards 11ª, as indicated at 13, is a lever 14, which is connected at opposite sides of its pivot to the upper ends of the cuffs 9, by means of rods 7 and 15.

To the upper end of the lever 11ª is loosely connected the forward end of an operating-lever 8, the rear end of which is shaped to form a hand-loop adapted to be conveniently grasped by the operator. The rod is curved slightly so as to dispose its rear portion toward the right-hand plow-handle and is provided with a locking-lug 17 that may be easily engaged with or disengaged from a convenient tooth of a curved toothed locking-standard 16 secured to said plow-handle.

This completes the construction of our invention, and the operation is as follows: The plow of course may be used either end first, and when in use, the cuffs 9 embrace the reduced ends of the mold-board frame and the beam and the curved bolts 11 pass through the holes 6 made for their reception in the ends of the mold-board frame and into the sockets forming a continuation thereof in the under side of the plow-beam. Whenever it is desired to reverse the plow-beam without lifting the mold-boards from the furrow it is simply necessary to draw upon the rod 8, which oscillates the lever 14, and this in turn oscillates the cuffs 9 so as to swing their lower ends outward and withdraw the curved bolts from their engagement with the ends of the mold-board frame and the beam. The team may now be turned, the beam readily turning on the king-bolt 2 until the beam points in the opposite direction. When the operator sees or hears the detents 12 snap over the upper edge of the mold-board frame he will know that the parts align and he can then return the parts to their locking position by a simple thrust of forward push upon the rod 8, locking the parts in this position by engaging the tooth 17 of the rod 8 with a convenient tooth of the locking-standard 16. The plowing can then be continued in the opposite direction.

It will be obvious that a plow thus constructed can be used upon either side of a hill as the same is capable of being readily changed from a right-hand to a left-hand plow.

Having described our invention, what we claim is—

1. The combination with a double ended mold-board frame, the opposite ends of which are provided with holes, of a superimposed pivoted plow-beam arranged thereon and having sockets forming continuations of the holes, an intermediate standard, a lever intermediately pivoted thereon, a rod for operating said lever, opposite cuffs carried by and pivoted to the beam, connecting-rods between the same and the opposite ends of the lever, and curved bolts located at the lower ends of the cuffs and adapted to enter the holes of the frame and sockets of the beams, substantially as specified.

2. The combination with the double ended mold-board frame, the opposite ends of which are reduced, of a superimposed plow-beam pivoted on the frame, opposite cuffs pivoted beyond the ends of the frame and adapted to loosely embrace the latter, opposite standards rising from the beam, a lever intermediately pivoted at the upper end of the same, connecting rods between the ends of the lever and the upper ends of the cuffs, a segmental toothed locking standard carried by one of the handles of the plow, and an operating-rod loosely connected to the upper end of the lever and provided with a tooth for engaging those of the standard, substantially as specified.

3. The combination with a double ended mold-board frame, of the superimposed pivoted beam, means for locking the beam upon the frame, and opposite spring-detents secured to and extending down from the sides of the beam and embracing the mold-board frame, substantially as specified.

4. The combination with the double ended mold-board frame, the superimposed pivoted plow-beam, the opposite cuffs for engaging the ends of the frame and pivoted to the beam, of the opposite vertical standards extending vertically from the beam and having their lower ends flared to form curved spring detents depending below the under side of the beam and at the opposite sides of the frame, the lever intermediately pivoted between the upper ends of the standards, and the operating rod connected to the upper end of the lever, substantially as specified.

In testimony whereof we affix our signatures in presence of two witnesses.

GOODLOE C. TWYMAN.
    BERT P. EASLEY.

Witnesses:
 J. M. WARD,
 JOS. G. COVINGTON.